United States Patent Office 3,115,519
Patented Dec. 24, 1963

3,115,519
STABLE ESTERS
Benjamin F. Crouse and William W. Reynolds, East Alton, Ill., assignors to Shell Oil Company, New York, N.Y., a corporation of Delaware
No Drawing. Filed Sept. 19, 1960, Ser. No. 56,667
2 Claims. (Cl. 260—488)

This invention relates to novel pivalic acid esters and, more particularly, it relates to novel esters of pivalic acid and polyols which are branched on the beta carbon atom.

The esters of alkanols and alkanolic acids make up an important class of compounds which have been employed as lubricants for gas turbine engines. These compounds are more resistant to oxidation and thermal decomposition at the high operating temperatures of such engines than are conventional hydrocarbon lubricants. Typical esters are the monohydric alkanol esters of dicarboxylic acids, e.g., di-2-ethyl hexyl sebacate and similar azelates and adipates; and the monocarboxylic alkanoic esters of polyhydric alkanols, e.g., pentaerythrityl tetracaproate, the tributyrates of trimethylol ethane and trimethylol propane, and the like.

It has been found that certain novel pivalic acid esters of certain polyols have unexpectedly superior thermal and oxidation stability to the conventional esters. It is an object of the present invention to provide such novel esters. Another object of the invention is to provide superior lubricant compositions based on such esters. Other objects of the invention will be apparent from the following description thereof.

These objects are accomplished in the invention by the polypivalate of a polyhydric alkanol having $n$ methylol groups attached to a single carbon atom, $n$ being an integer from 3 to 4, with the provision that when $n$ is 3, said carbon atom is the terminal carbon atom in an alkane chain having from 2 to 8 carbon atoms. Such compounds have the general formula

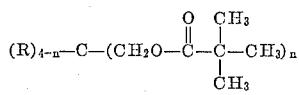

wherein R is an alkyl group having up to 7 carbon atoms and $n$ is an integer from 3 to 4. When $n$ is 4, the ester is the tetrapivalate ester of pentaerythritol. When $n$ is 3, the esters are the tripivalate esters of trimethylol ethane, trimethylol propane, trimethylol butane, trimethylol isopropyl methane, trimethylol octane, and the like. The tripivalate esters of trimethylol ethane and trimethylol propane combine the best properties of stability and lubricity and are therefore the preferred members of this type of ester.

In general, these esters are readily prepared by the esterification of the polyol with an acidic pivalic compound. For example, the polyol and pivalyl chloride may be reacted together in the presence of such a hydrogen chloride acceptor as pyridine. Since complete esterification of the polyol is required for an oxidatively stable ester, it is desirable to employ an excess of the pivalyl compound.

The polyols which are employed for preparation of the polyesters of the invention are those polyhydric compounds having $n$ methylol or —$CH_2OH$ groups attached to a single carbon atom, $n$ being an integer from 3 to 4, with the provision that when $n$ is 3, said carbon atom is terminal carbon atom in an alkane chain having from 2 to 8 carbon atoms. The carbon atom may be alone, as in the case of pentaerythritol, or it may be the terminal carbon atom of an alkane chain, as in the case of trimethylol ethane or trimethylol propane.

Reacted with these polyols to afford the polypivalate esters of the invention are acidic pivalic acid compounds such as pivalic acid, pivalyl chloride, or pivalic anhydride. The esters resulting from these esterifications may be readily recovered from the reaction mixture by precipitation, fractional distillation, extraction, or the like.

Under the conditions of the reaction, it has been observed that complete esterification of the polyol may not always take place. A small amount of hydroxyl content in the polyester products is not harmful, although increases in the hydroxyl content thereof bring about increases in copper corrosion by the triesters. On the other hand, the hydroxyl groups do enhance the dispersant effect of the esters and reduce somewhat the deposition of decomposition products of the lubricant, such as sludges on magnesium, steel, silver and aluminum. These competing effects are such that the maximum permissible hydroxyl content for the esters has been determined to be about 0.3 mole per liter, and more hydroxyl content than this is undesirable.

Exemplary esters prepared in this way are pentaerythrityl tetrapivalate; 1,1,1 - tri(pivaloxymethyl)ethane; 1,1,1 - tri(pivaloxymethyl)propane; 1,1,1 - tri(pivaloxymethyl)pentane; 1,1,1-tri(pivaloxymethyl)octane; and the like. These compounds not only possess desirable properties of lubricity and viscosity at the high temperatures of jet engine operation, but they are unusually stable with respect to oxidative and thermal degradation at such temperatures.

To illustrate the unexpectedly superior high temperature stability of the compounds of the invention, the following Table I is presented, giving comparative data on the relative oxidation rates of pantaerythrityl tetrapivaliate and several other pentaerythritol tetraesters.

TABLE I

Oxidation Stability of Pentaerythrityl Esters at 400° F. High-Temperature Oxidation Test [a]

| Ester | Hydroxyl [c] Content (Moles/ Liter) | Hr. to Absorb 1 Millimole, $O_2$/g. | Acid [g] No. of Oxidized Oil (mg. KOH/g.) |
|---|---|---|---|
| Pentaerythrityl tetrabutyrate | 0.25 / 1.2 / 3.6 | [d] 96 / [d] 62 / [d] 32 | 0.2 / 0.7 / 6.8 |
| Pentaerythrityl tetracaproate | 0.19 / 1.45 | [d] 80 / [d] 25 | 0.5 / 2.9 |
| Pentaerythrityl dicaproate dicaprylate | 0.52 | [d] 30 | 1.0 |
| Pentaerythrityl dibutyrate dicaprate | 0.19 | [d] 72 | 1.1 |
| Hercoflex 600 [b] | 0.34 | [d] 78 / [e] 88 | 0.8 / 0.02 |
| Hercoflex 707 | 0.34 | [d] 54 | 0.6 |
| Pentaerythrityl tetrapivalate | 0.20 | [f] 51 / [d] 137.5 | [h] 2.6 / [j] 0.2 |

[a] Test conditions: 400° F., 1 liter air/hr.; 20 g. sample; Cu, Mg, Ag, Fe catalysts.
[b] Mixed pentaerythrityl ester containing equimolar quantities of normal $C_4$, $C_6$, $C_8$ and $C_{10}$ acids.
[c] Determined by infrared spectra to ±0.02 mole/liter; peak at 2.8 microns.
[d] Inhibited with 1% w. diphenylamine +0.5% w. phenothiazine.
[e] Inhibited with 1% w. beta,beta'-dinaphthylamine +0.5% w. phenothiazine.
[f] Uninhibited.
[g] Determined on basis of 20-hour test.
[h] Determined after 102 hours.
[j] Determined after 117 hours.

It will be seen from these data that the uninhibited penterythrityl tetrapivalate was more stable than many of the inhibited pentaerythrityl tetraesters tested, and the inhibited tetrapivalate was far more stable than any of the inhibited tetraesters tested. Furthermore, the acidity of the tetrapivalate after absorption of one millimole of oxygen per gram is relatively low, indicating that it is desirably non-corrosive with regard to metallic engine parts under conditions of operation.

The tripivaloxy esters of the trimethyl alkanes described generally have low melting points, and it has been found that by mixing these esters with the structurally pentaerythrityl tetrapivalate, useful lubricants of intermediate melting point may be obtained. Because of their structural similarity, the mixtures are homogeneous, extremely oxidation-resistant thermally stable compositions, and by controlling the relative proportions of the tripivalate and tetrapivalate esters, lubricants of varying melting point and viscosity are produced. Several types of tripivalate esters also may be mixed with the pentaerythrityl tetrapivalate; or the mixtures of tripivalates alone may be employed. Preferred mixtures of pivalate esters are those containing up to three polypivalates, and having no polypivalate present in amount less than 5% w. These mixtures include not only compositions whose melting point is between those of the components but also eutectic mixtures.

In combination with the polyesters of the invention may be used such additives as will effectively stabilize against oxidation and corrosion. Such additives are exemplified by 5-ethyl-10,10-diphenyl phenazasiline, phenothiazine, diarylamines, including phenyl-alpha-naphthylamine and diphenylamine; thiodiarylamines, including phenylthio-alpha(methylnaphthyl)amine and thio(diethylphenyl)amine; aminophenols, including N-n-valeryl-4-amino-3-pentadecylphenol and N-palmitoyl-p-aminophenol; dialkyl selenides and tellurides, represented by didecyl selenide, dilauryl diselenide, diacetyl telluride and dilauryl selenoxide; basic sulfonates such as calcium petroleum sulfonates; and indium carboxylates, including indium 2-ethylhexanoate, indium p-octyl benzoate, and indium caprylate. The additives may be used in amounts sufficient to afford the desired stabilization, such amounts being conveniently less than about 5% by weight, based on the ester.

Because of their excellent high temperature stability and oxidation resistance, the ester compositions of the invention are also useful as the lubricating phase of greases, either as the sole lubricant present or in admixture with more conventional lubricating substances. Since it is possible to take advantage of these properties, the greases utilizing them are especially useful at elevated temperatures and under the other severe operating conditions. Gelling agents which are useful include the conventional soaps such as alkali metal (sodium, lithium), alkaline earth metal (calcium) polyvalent metal (aluminum) and other soaps of fatty acids or of hydroxy fatty acids, especially where temperatures do not exceed about 300° F. For higher temperatures, it is advisable to utilize grease-forming colloids such as silica aerogels; finely divided silica prepared by burning silanes; clays; ammonium clays such as trimethyl stearyl ammonium bentonites; and especially high-temperature gelling agents such as indanthrene dyes and indogens, as well as polymeric clays, such as clays coated with phenol-formaldehyde resins, aniline, formaldehyde resins and the like. Graphite may be employed for this purpose as well. The proportion of gelling agent will depend upon the consistency of the grease desired and upon the temperatures to which the grease compositions will be subjected. Normally, this will be between 2 and 40% by weight of the total grease composition. Methods of preparing such greases are known in the art.

The following examples will illustrate the procedures by which the novel esters of the invention may be prepared and employed. It should be understood, however, that these examples are merely illustrative and are not to be regarded as limitations to the appended claims, since the basic teachings therein may be varied at will as will be understood by one skilled in the art. In the examples, the proportions are expressed in parts by weight unless otherwise noted.

EXAMPLE I.—PENTAERYTHRITYL TETRAPIVALATE

In a two-liter, three-neck flask equipped with a stirrer, dropping funnel, thermometer, and condenser bearing a drying tube were placed 91.7 g. (0.675 mole) of pentaerythritol and 500 ml. of pyridine. The mixture was cooled to 4° C. and 343 g. (2.85 moles) of pivalyl chloride added with stirring over 1.5 hours. During the addition the temperature was maintained at 12–19° C. Then the reaction mixture was heated to 85° C. over 1¼ hours and allowed to stand over a weekend. Additional pyridine (150 ml.) was added to slurry the pyridine hydrochloride and the mixture heated to 100° C. over two hours.

The flask contents were poured into three liters of water. A dense white solid precipitated and was filtered. The crude ester was washed in the funnel successively with two 300-ml. portions of water, two 500-ml. portions of 0.05 N HCl, three 300-ml. portions of water, five 375-ml. portions of 5% $Na_2CO_3$ and four 300-ml. portions of distilled water. The solid was sucked dry in the funnel for two hours and dried in a desiccator over $CaCl_2$ with intermittent periods of evacuation for one week until constant weight was obtained. The white solid melted at 125.5–127.5° C., giving a yield of 314 g. or 98.6%.

| Percent | C | H | M.W. |
|---|---|---|---|
| Calculated for $C_{25}H_{44}O_8$ | 63.5 | 9.32 | 472 |
| Found | 63.1 | 9.50 | 455 |
|  | 63.3 | 9.43 | 454 |

Infrared spectrum indicated 0.20 mole OH/liter.

EXAMPLE II.—TRIMETHYLYLETHANE TRIPIVALATE

In a one-liter flask equipped with a stirrer, thermometer, dropping funnel, and a condenser bearing a drying tube were placed 37.2 g. (0.3 mole) of reagent grade trimethylol ethane and 250 ml. of pyridine. The mixture was chilled to 8° C. and 114.5 g. (0.95 mole) of trimethylacetyl chloride were added with stirring over two hours, maintaining the temperature below 15° C. by means of an ice bath.

The mixture was then refluxed gently overnight and poured hot into two liters of distilled water. The oily ester was extracted from the pyridinium chloride with benzene and the benzene extract freed of pyridine by washing three times with 100 ml. portions of 1 N HCl until the spend wash was distinctly acidic. The organic layer was neutralized by washing with two 100-ml. portions of 1% w. $Na_2CO_3$ and three portions of water, dried over $CaCl_2$ and stripped under vacuum to yield 107.6 g. of viscous oil which crystallized upon standing to a mushy solid. The crude ester was taken up in 400 ml. of petroleum ether and percolated over a column of 580 g. of 80–200 mesh F–20 alumina previously wetted with petroleum ether. The column was eluted with 750 ml. of petroleum ether and the eluate stripped under vacuum to yield 75.4 g. of a white crystalline solid melting 37.5–38.5° C., a yield of 67.6%.

| Percent | C | H | M.W. |
|---|---|---|---|
| Calculated for $C_{20}H_{36}O_6$ | 64.5 | 9.68 | 372 |
| Found | 64.10 | 9.73 | 344 |
|  | 64.53 | 9.74 | 349 |

The infrared spectrogram of the ester indicated an OH value of 0.19 mole/liter.

By substituting 1,1,1-trimethylol propane in the process described, 1,1,1-tri(pivaloxymethyl)propane may be obtained in a similar manner.

EXAMPLE III

The load-carrying ability of two ester lubricants was evaluated in the Shell four-ball wear test, the tests being conducted at 500° F. for one hour. The results obtained are as follows:

TABLE II

| Ester | Wear Scar Diameter, mm. | |
|---|---|---|
| | 600 r.p.m., 50 kg. Load | 1,800 r.p.m., 15 kg. Load |
| Pentaerythrityl tetrapivalate | 1.56 | 1.16 |
| Trimethylyl ethane tripivalate | 1.53 | 1.14 |

EXAMPLE IV

To illustrate the stability of the ester lubricants of the invention, a representative ester was tested in the Shell small-scale panel coke test. In this test, a metal panel heated to a predetermined temperature is continually splashed with oil maintained at a sump temperature of 300° F. less than that of the panel, while air is circulated in the vapor space between the splashes and the panel. After one hour of testing, the amount of coke deposited on the panel by each sample is determined by weighing. In Table III below, the coke levels of various candidate lubricants are compared.

TABLE III

| Compound | Wt. of Coke, mg. | |
|---|---|---|
| | 700° F. | 800° F. |
| Pentaerythrityl tetrapivalate | 1.0 | 3.6 |
| GTO-138 (stabilized di-2-ethyl-hexyl sebacate) | 35 | 37 |
| General Electric Silicone 81406 (methyl chlorophenyl silicone) | 14 | 373 |

From these data it will be seen that the tetrapivalate ester of the invention was appreciably more stable than other known lubricants.

EXAMPLE V

Three esters, including the tetrapivalate ester of Example I, were tested for oxidation stability by means of the Dornte oxidation test. In this test, the candidate lubricant was heated in contact with copper wire at a predetermined temperature while gaseous oxygen was bubbled through it. The oxygen absorption rate is shown below.

TABLE IV

| Compound | Hr. to Absorb 0.5 Mole Oxygen Per 500 g. Compound | | |
|---|---|---|---|
| | 400° F. | 450° F. | 500° F. |
| Pentaerythrityl tetrapivalate | | | 2.6 |
| GTO-138 | | 2.5 | |
| Hexane-1,6-diol dipivalate | 0.8 | | |

From these data, it is apparent that the pentaerythrityl tetrapivalate ester is the most stable of the three esters examined.

EXAMPLE VI

A series of lubricants comprising the following mixtures are prepared:
(1) 25% w. pentaerythrityl tetrapivalate
    75% w. trimethylyl ethane tripivalate
(2) 50% w. pentaerythrityl tetrapivalate
    50% w. trimethylyl propane tripivalate
(3) 25% w. trimethylyl propane tripivalate
    50% w. trimethyl ethane tripivalate
    25% w. pentaerythrityl tetrapivalate
(4) 50% w. trimethylyl propane tripivalate
    50% w. trimethylyl ethane tripivalate Upon testing by the methods described above, these mixtures are found to have excellent high-temperature lubricating properties, together with superior thermal and oxidation stability.

We claim as our invention:
1. Pentaerythrityl tetrapivalate.
2. The stabilized composition consisting essentially of pentaerythrityl tetrapivalate containing 1% w. diphenylamine and 0.5% w. phenothiazine.

References Cited in the file of this patent

UNITED STATES PATENTS

| | | |
|---|---|---|
| 2,031,368 | Hodson | Feb. 18, 1936 |
| 2,257,359 | Williams | Sept. 30, 1941 |
| 2,499,723 | Coffman et al. | Mar. 7, 1950 |
| 2,512,771 | Glavis et al. | June 27, 1950 |
| 2,627,489 | Drake et al. | Feb. 3, 1953 |
| 2,661,369 | Raddle | Dec. 1, 1953 |
| 2,862,961 | Goreau | Dec. 2, 1958 |
| 2,958,706 | Hurwitz et al. | Nov. 1, 1960 |
| 2,975,152 | Hurwitz | Mar. 14, 1961 |
| 2,991,297 | Cooley et al. | July 4, 1961 |